US011436299B2

(12) United States Patent
Inoue

(10) Patent No.: US 11,436,299 B2
(45) Date of Patent: Sep. 6, 2022

(54) INFORMATION PROCESSING SYSTEM, SERVER APPARATUS, AND INFORMATION PROCESSING METHOD

(71) Applicant: Yuusuke Inoue, Kanagawa (JP)

(72) Inventor: Yuusuke Inoue, Kanagawa (JP)

(73) Assignee: Ricoh Company, Ltd., Toyo (JP)

( * ) Notice: Subject to any disclaimer, the term of this patent is extended or adjusted under 35 U.S.C. 154(b) by 127 days.

(21) Appl. No.: 16/896,383

(22) Filed: Jun. 9, 2020

(65) Prior Publication Data
US 2020/0394247 A1 Dec. 17, 2020

(30) Foreign Application Priority Data

Jun. 11, 2019 (JP) .............................. JP2019-108935
Apr. 28, 2020 (JP) .............................. JP2020-079580

(51) Int. Cl.
G06F 15/16 (2006.01)
G06F 16/957 (2019.01)
G06F 16/954 (2019.01)
G06F 21/57 (2013.01)
H04L 9/40 (2022.01)
H04L 67/02 (2022.01)

(52) U.S. Cl.
CPC ........ G06F 16/9577 (2019.01); G06F 16/954 (2019.01); G06F 21/577 (2013.01); H04L 63/1433 (2013.01); H04L 67/02 (2013.01); G06F 2221/2119 (2013.01)

(58) Field of Classification Search
CPC ............... G06F 16/9577; G06F 16/954; G06F 2221/2119
See application file for complete search history.

(56) References Cited

U.S. PATENT DOCUMENTS

2004/0261010 A1    12/2004  Matsuishi
2014/0082140 A1    3/2014   Toussaint et al.
(Continued)

FOREIGN PATENT DOCUMENTS

EP    3410364      12/2018
JP    7-110763     4/1995
(Continued)

OTHER PUBLICATIONS

Extended European Search Report for EP20179306.4 dated Nov. 10, 2020.

Primary Examiner — Anthony Mejia
(74) Attorney, Agent, or Firm — IPUSA, PLLC

(57) ABSTRACT

An information processing system includes: a server apparatus to manage an application; and an electronic device to communicate with the server apparatus via a network, the electronic device having a web browser for displaying a web page provided by the server apparatus. The server apparatus includes circuitry to: receive registration of an application having customized a display screen; cause the display screen of the application to be displayed within a frame of the web page; and in response to an input to the display screen displayed within the frame, receive a request for executing at least one function of the information processing system from a script outside the frame, via an interface for providing the at least one function of the information processing system, and control execution of the at least one function.

9 Claims, 16 Drawing Sheets

(56) References Cited

U.S. PATENT DOCUMENTS

| | | | |
|---|---|---|---|
| 2014/0244623 A1* | 8/2014 | King | G06F 16/212 |
| | | | 707/722 |
| 2014/0245130 A1 | 8/2014 | Ferreira et al. | |
| 2017/0322782 A1* | 11/2017 | Pakiman | G06F 8/34 |
| 2018/0013913 A1 | 1/2018 | Hayashi et al. | |
| 2018/0183955 A1* | 6/2018 | Sasakuma | H04N 1/00037 |
| 2018/0218006 A1* | 8/2018 | Palmer | G06Q 10/101 |
| 2019/0138732 A1* | 5/2019 | Hong | G06F 21/577 |
| 2019/0230090 A1* | 7/2019 | Kathiara | H04L 9/3247 |
| 2019/0238653 A1* | 8/2019 | Syomichev | G06F 3/0656 |
| 2019/0289158 A1 | 9/2019 | Inoue | |
| 2020/0201580 A1* | 6/2020 | Kim | G06F 3/123 |

FOREIGN PATENT DOCUMENTS

| | | |
|---|---|---|
| JP | 2004-318842 | 11/2004 |
| JP | 2018-014079 | 1/2018 |

* cited by examiner

```
<!DOCTYPE html>
...
<div>
...
</div>
<div>
  <button id="js-start-button">Start</button>     611
</div>
...
</div>
<script>
(function(){
  var x;
  var startButton=document.getElementById("js-start-button");
  var libScanner;
  function setStartButton(startButton,start){
    startButton.onclic = start;
  }                                                       612
  function start(){
    var options = {
      requestOptions:[
        ...
      ],
    }
    libScanner.execute(options);    613
  }
...
</script>
...
```

222

```
...
libScanner.execute(options){
  //code to execute scan process
  ...
}                                    621
```

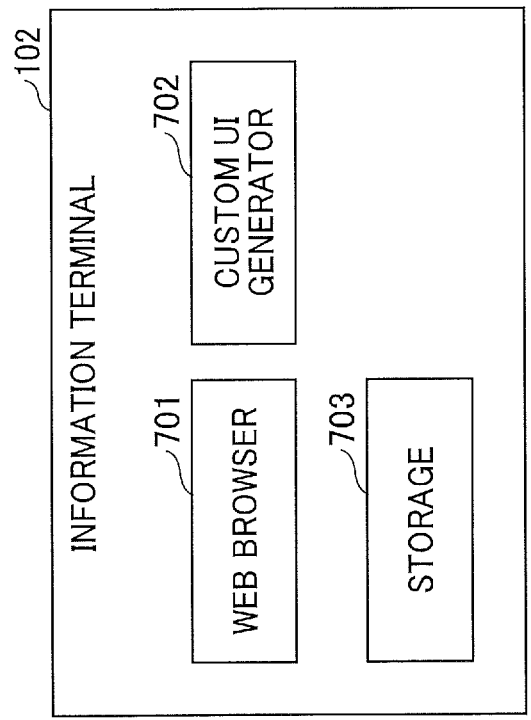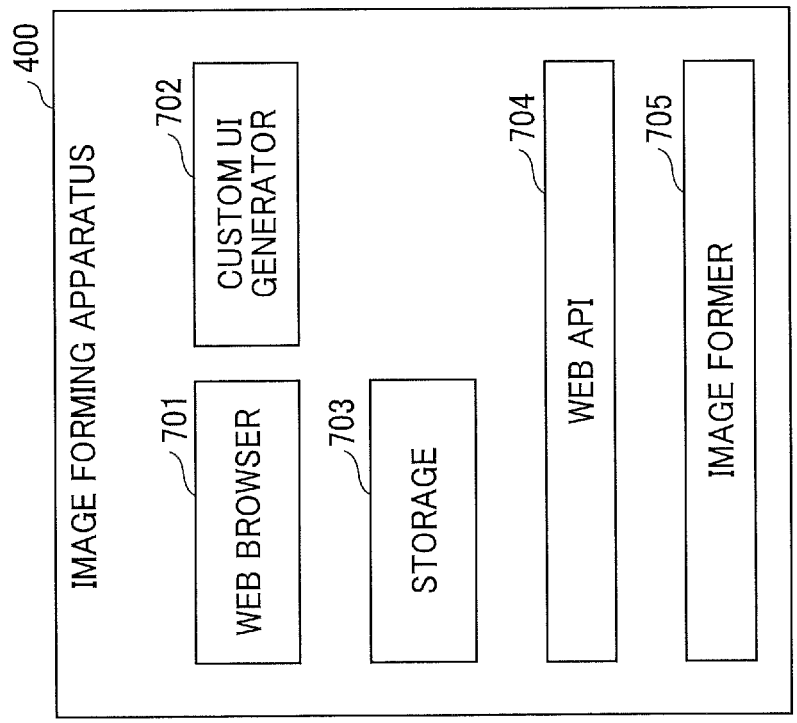

FIG. 9C

```
{ "apps": [
  {
    "url": "https://example.com/custum_ui.thml?applicationID=111111",
    "names": {
      "en": "App1",
      "ja": "APP1 "
    },
    "icon": " data:image/png;base64,XXXXXXXXXX",
    .
    .
  },
  {
    "url": " https://example.com/custum_ui.thml?applicationID=1111112",
    "names": {
      "en": "App2",
      "ja": " APP2 "
    },
    "icon": " data:image/png;base64,XXXXXXXXXX",
    .
    .
  },
  .
  .
  {
    "url": " https://example.com/custum_ui.thml?applicationID=1111116",
    "names": {
      "en": "App6",
      "ja": " APP6 "
    },
    "icon": " data:image/png;base64,XXXXXXXXXX",
    .
    .
  },
]}
```

- 930
- 932
- 933
- 935
- 934
- 931a
- 931b
- 931f

INFORMATION PROCESSING SYSTEM, SERVER APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application Nos. 2019-108935, filed on Jun. 11, 2019, and 2020-079580, filed on Apr. 28, 2020, in the Japan Patent Office, the entire disclosure of which is hereby incorporated by reference herein.

BACKGROUND

Technical Field

The present invention relates to an information processing system, a server apparatus, and an information processing method.

Description of the Related Art

There is a known background art of customizing the method for displaying the user interface (UI) of a web page on a per user basis and displaying the UI using the customized display method.

There is a known web page generation device with which it is possible to register, for example, the item or the range to be customized on a per user basis so as to generate the application (hereinafter sometimes simply referred to as app) displaying a web page.

In an information processing system that provides an electronic device such as an image forming apparatus with the application that executes a predetermined process by using a server apparatus such as a service providing server, there is a demand for flexibly customizing the display screen of the application.

The background art disclosed above, however, has a disadvantage such that it is difficult to flexibly customize the display screen of an application as the display screen is customized with the item or within the range previously set by the developer of the application.

SUMMARY

Example embodiments include an information processing system including: a server apparatus to manage an application; and an electronic device to communicate with the server apparatus via a network, the electronic device having a web browser for displaying a web page provided by the server apparatus. The server apparatus includes circuitry to: receive registration of an application having customized a display screen; cause the display screen of the application to be displayed within a frame of the web page; and in response to an input to the display screen displayed within the frame, receive a request for executing at least one function of the information processing system from a script outside the frame, via an interface for providing the at least one function of the information processing system, and control execution of the at least one function.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6B is a schematic view illustrating a custom UI app and a custom UI library according to the first embodiment of the present invention;

FIG. 7A is a block diagram illustrating an example of the functional configuration of the image forming apparatus according to the first embodiment of the present invention;

FIG. 7B is a block diagram illustrating an example of the functional configuration of an information terminal according to the first embodiment of the present invention;

FIG. 9C is a diagram illustrating an example of application list information according to the first embodiment of the present invention;

Figure 1:
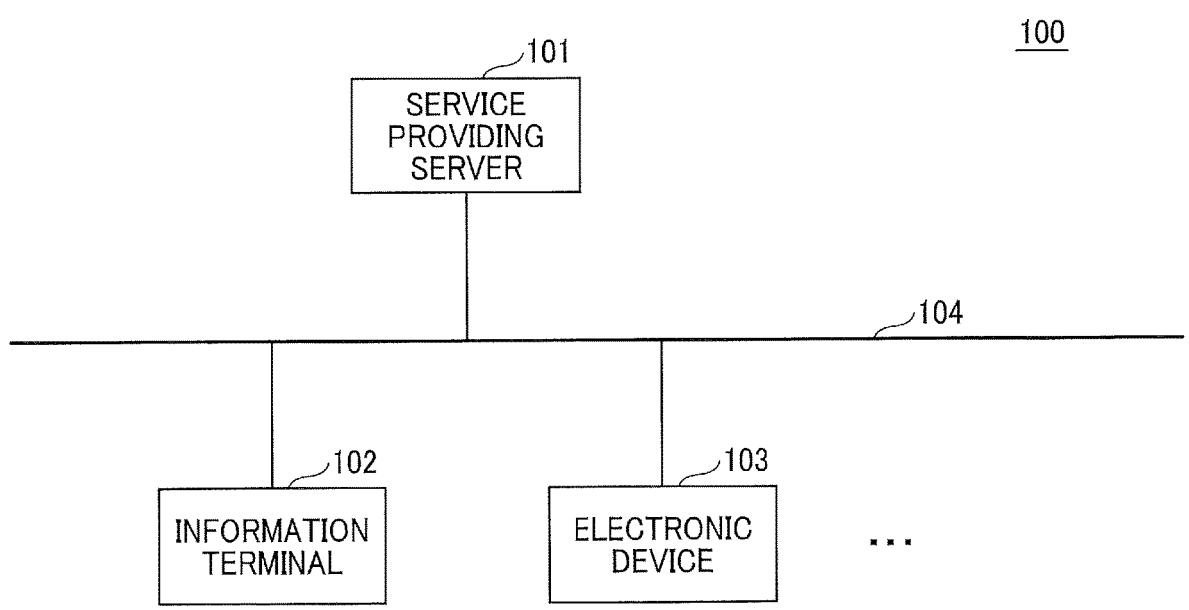
FIG. 1 is a diagram illustrating an example of the system configuration of an information processing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular focus "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described below in detail.

<System Configuration>

FIG. 1 is a diagram illustrating an example of the system configuration of an information processing system 100 according to an embodiment of the present invention. The information processing system 100 includes, for example, a service providing server (server apparatus) 101, an information terminal 102, and one or more electronic devices 103. The service providing server 101, the information terminal 102, and the one or more electronic devices 103 are communicatively connected to one another via a communication network 104 such as the Internet or a local area network (LAN).

The service providing server 101 includes an information processing apparatus having the configuration of a computer or a system including a plurality of information processing apparatuses. The service providing server 101 manages a web application (hereinafter referred to as application) to execute a predetermined process and provides the web application to the electronic device 103, or the like, connected via the communication network 104.

The web application provided by the service providing server 101 includes, for example, a web application that executes a work flow (processing procedure) defining a plurality of processes or a web application that executes one or more functions of the electronic device 103. The web application provided by the service providing server 101 is not limited thereto and may include a web application that executes various processes.

The work flow includes, for example, the information that defines a series of processes combining a plurality of components that perform a predetermined process, such as an input process, a conversion process, or an output process, on the electronic data such as the image data to be processed. The components are programs that execute the respective processes included in the work flow and are sometimes referred to as plug-in.

The information terminal 102 includes an information processing apparatus such as a desktop personal computer (PC), a notebook PC, a smartphone, or a tablet terminal. The developer (or user), etc. (hereinafter simply referred to as the developer) of an application uses a web browser provided by the information terminal 102 to access the web page provided by the service providing server 101 so as to set the application and the work flow. Further, in the following, the developer and the user may be used interchangeably.

The information terminal 102 enables the registration, in the service providing server 101, of a web application whose operation screen is customized with a customization tool provided by, for example, a service provider who administers the service providing server 101.

The electronic device 103 includes a web browser that displays the web page provided by the service providing server 101 and accesses the web page provided by the service providing server 101 to use an application. In the following description, it is assumed that the electronic device 103 includes, for example, an image forming apparatus such as a multifunction peripheral (MFP) having a scan function, a copy function, a printer function, a facsimile function, etc. in one housing.

The electronic device 103 is not limited to an image forming apparatus and may include various devices including a web browser and may access the web page provided by the service providing server 101. For example, the electronic device 103 may include an output device such as a projector (PJ), an interactive white board (IWB) (a white board having an electronic blackboard function enabling mutual communications), digital signage, or a head-up display (HUD) device. The electronic device 103 may include a device such as an industrial machine, an imaging device, a sound collector, a medical device, a network appliance, a car (connected car), a digital camera, or a wearable terminal. The electronic device 103 may be a general-purpose information processing apparatus such as a notebook PC, a mobile phone, a smartphone, a tablet terminal, a game machine, a Personal Digital Assistant (PDA), a digital camera, a wearable PC, or a desktop PC.

<Schema of Process>

Figure 2:
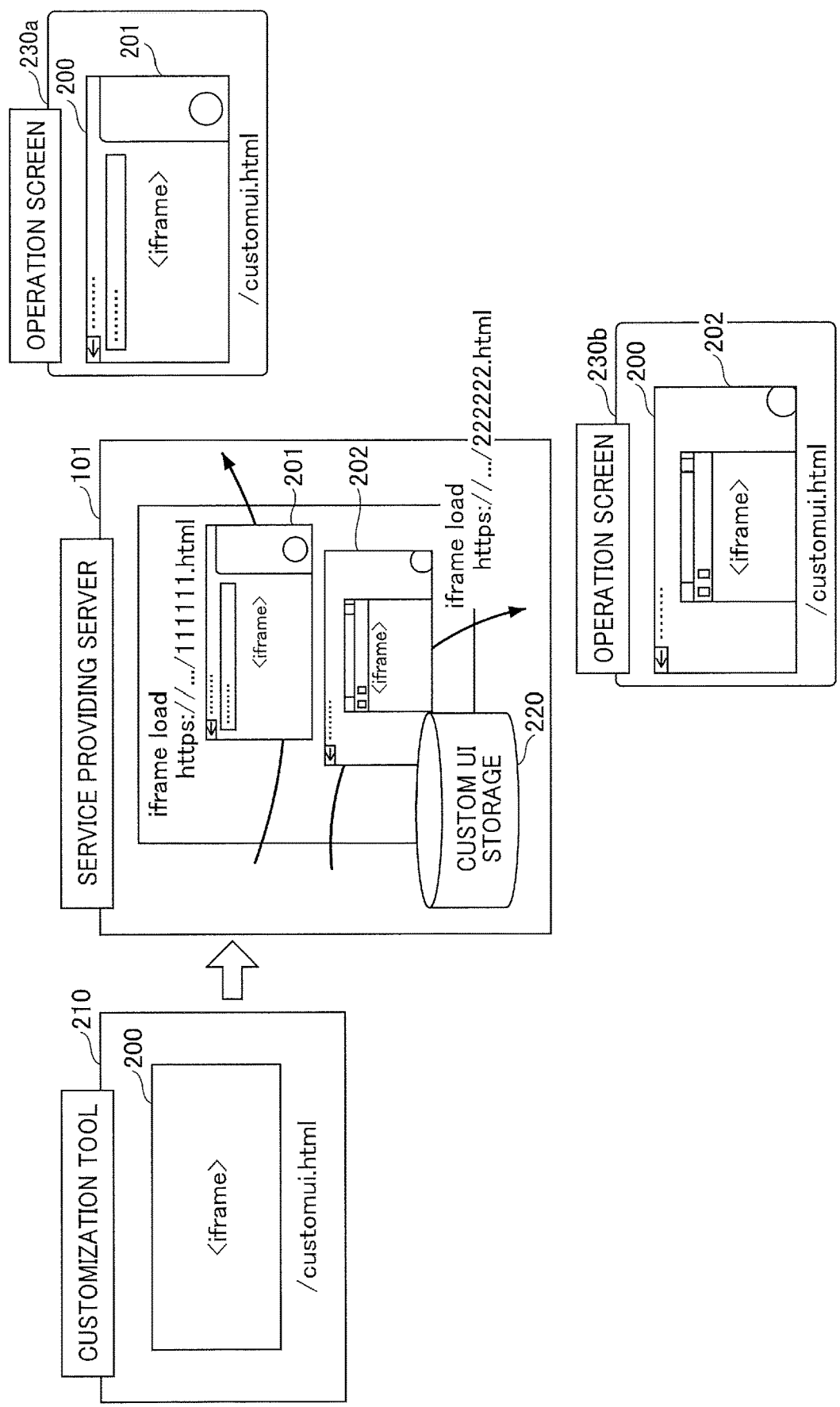
FIG. 2 is a schematic view illustrating a method for displaying an operation screen according to an embodiment of the present invention.

FIG. 2 is a schematic view illustrating the method for displaying the operation screen according to an embodiment of the present invention.

For example, the developer may use a customization tool 210 installed in the information terminal 102, etc. to flexibly customize the display screen of the web application displayed in an iframe 200 included in the operation screen displayed by the electronic device 103, etc.

Here, iframe is the function of displaying a different web page in a predetermined area (frame) within a web page. The iframe is an example of the frame included in the web page displayed by the electronic device 103, etc.

For example, the developer may generate a web application (hereinafter referred to as "app A") that displays a customized display screen 201 illustrated in FIG. 2 by using the customization tool 210 and register the app A in the service providing server 101.

After the service providing server 101 receives the registered app A whose display screen has been customized, the service providing server 101 stores the registered app A in a custom UI storage 220, or the like. In response to a start request for the app A received from the electronic device 103 such as an image forming apparatus, the service providing server 101 uses the app A stored in the custom UI storage 220, or the like, to cause the display screen 201 of the app A to be displayed in the iframe 200 included in an operation screen 230*a* displayed by the electronic device 103.

Similarly, the developer may use the customization tool 210 to generate a web application (hereinafter referred to as an app B) that displays a customized display screen 202 illustrated in for example FIG. 2 and register the app B in the service providing server 101.

After the service providing server 101 receives the registered app B whose display screen has been customized, the service providing server 101 stores the registered app B in the custom UI storage 220, or the like. In response to a start request for the app B received from the electronic device 103 such as an image forming apparatus, the service providing server 101 uses the app B stored in the custom UI storage 220, or the like, to cause the display screen 202 of the app B to be displayed in the iframe 200 included in an operation screen 230*b* displayed by the electronic device 103.

As described above, the service providing server 101 allows the display screen (UI) of the web application generated by the developer to be displayed in the iframe 200 included in the web page displayed by the electronic device 103 such as an image forming apparatus.

However, it is difficult for the app A, the app B, and the like, displayed in the iframe 200 to directly issue an execution command for printing, scanning, etc. to the electronic device 103 such as an image forming apparatus. This is because the option "sandbox" is enabled in the setting for "iframe" used as a frame according to the present embodiment from a security perspective. Enabling this option prevents the content (custom UI app) in the iframe from executing an unauthorized process. Furthermore, enabling this option prevents the content in the iframe from directly using a function provided by the information processing system 100. Therefore, the service providing server 101 provides the app A, the app B, or the like, displayed in the iframe 200 with the interface to use one or more functions provided by the information processing system 100.

This allows the user of the electronic device 103 such as an image forming apparatus to perform a predetermined operation on the display screen of the web application displayed in the iframe 200 so as to cause the information processing system 100 to perform a predetermined process.

With the above configuration, multiple developers (e.g., vendors) may generate a web application (custom UI app) that displays a customized display screen and register the web application in the service providing server 101.

The above-described system configuration of the information processing system 100 is an example. For example, a developer may use a web browser provided by the electronic device 103 to, for example, set and register an application. The user may also use a web browser provided by the information terminal 102 to execute an application provided by the service providing server 101. The functions of the service providing server 101 may be distributed to a plurality of server apparatuss. For example, the server apparatus managing an application and the server apparatus executing a work flow may be different server apparatuss.

<Hardware Configuration>

Next, an example of the hardware configuration of each device included in the information processing system 100 is described.

(Hardware Configurations of the Service Providing Server and the Information Terminal)

Figure 3:
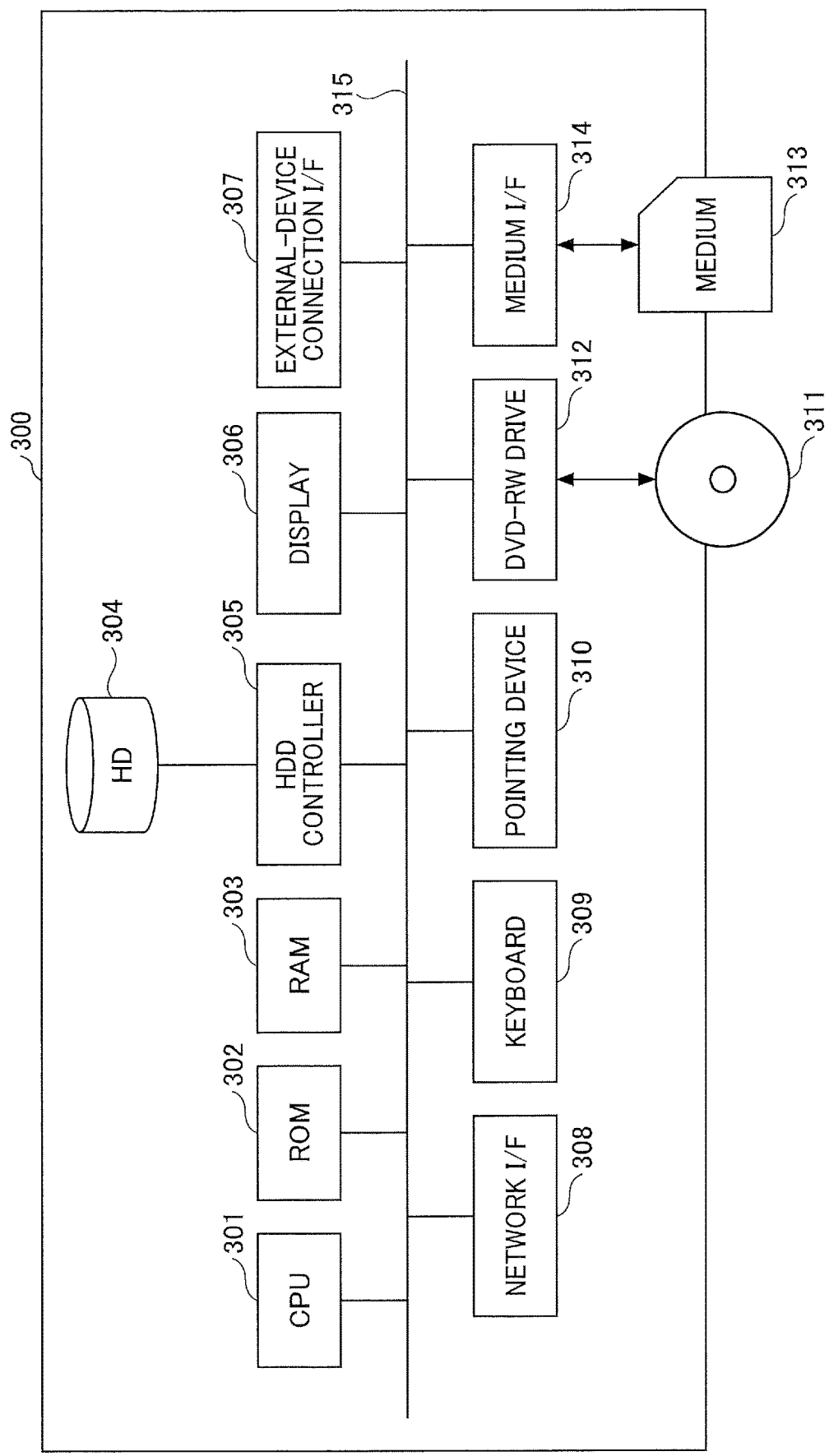
FIG. 3 is a block diagram illustrating an example of the hardware configuration of a computer according to an embodiment of the present invention.

FIG. 3 is a block diagram illustrating an example of the hardware configuration of a computer 300 according to an embodiment of the present invention.

The service providing server 101 has, for example, the hardware configuration of the computer 300 illustrated in FIG. 3. Alternatively, the service providing server 101 is implemented by using the plurality of computers 300 having the hardware configuration illustrated in FIG. 3. The information terminal 102 has, for example, the hardware configuration of the computer 300 illustrated in FIG. 3.

As illustrated in FIG. 2, the computer 300 includes, for example, a central processing unit (CPU) 301, a read only memory (ROM) 302, a random access memory (RAM) 303, a hard disk (HD) 304, a hard disk drive (HDD) controller 305, a display 306, an external-device connection interface (I/F) 307, a network I/F 308, a keyboard 309, a pointing device 310, a digital versatile disk rewritable (DVD-RW) drive 312, a medium I/F 314, and a bus line 315.

The CPU 301 controls the overall operation of the computer 300. The ROM 302 stores a program, such as an initial program loader (IPL), used for driving the CPU 301. The RAM 303 is used as a work area for the CPU 301. The HD 304 stores various types of data such as programs. The HDD controller 305 controls the reading or writing of various types of data from or to the HD 304 under the control of the CPU 301.

The display 306 presents various types of information such as a cursor, menu, window, characters, or images. The external-device connection I/F 307 includes an interface to connect various external devices. In this case, examples of the external device include a Universal Serial Bus (USB) memory or a printer. The network I/F 308 includes an interface to perform data communications using the communication network 104.

The keyboard 309 includes one type of input means including a plurality of keys to input characters, numerical values, various instructions, etc. The pointing device 310 includes one type of input means to, for example, select or execute various instructions, select the target to be processed, or move the cursor. The DVD-RW drive 312 controls the reading or writing of various types of data from or to a DVD-RW 311 that is an example of a removable recording medium. The DVD-RW 311 is not limited to a DVD-RW but may be a digital versatile disk recordable (DVD-R), etc. The medium I/F 314 controls the reading or writing (storing) of data from or to a medium 313 such as a flash memory. The bus line 315 includes an address bus, a data bus, various control signals, etc. to electrically connect the above-described components.

(Hardware Configuration of the Electronic Device)

Figure 4:
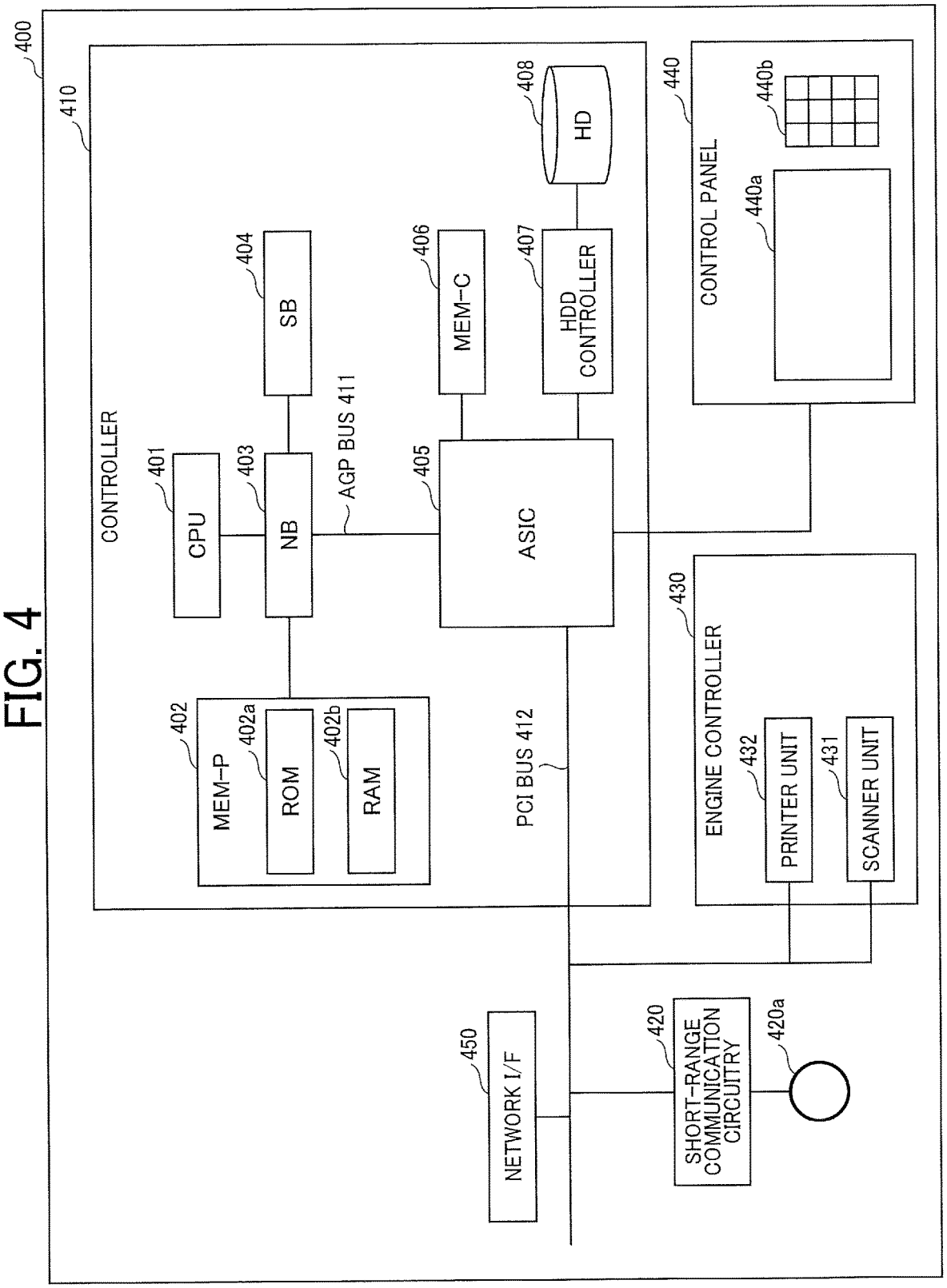
FIG. 4 is a block diagram illustrating an example of the hardware configuration of an image forming apparatus according to an embodiment of the present invention.

FIG. 4 is a block diagram illustrating an example of the hardware configuration of an image forming apparatus 400 according to an embodiment of the present invention. As an example of the hardware configuration of the electronic device 103, the hardware configuration of the image forming apparatus 400 is described. The electronic device 103 is not limited thereto and may be a different device having the configuration of a computer. As illustrated in for example FIG. 4, the image forming apparatus 400 includes a controller 410, a short-range communication circuitry 420, an engine controller 430, a control panel 440, a network I/F 450, etc.

The controller 410 includes a CPU 401, which is the primary part of the computer, a system memory (MEM-P) 402, a north bridge (NB) 403, a south bridge (SB) 404, an application specific integrated circuit (ASIC) 405, a local memory (MEM-C) 406 that is a storage, an HDD controller 407, and an HD 408 that is a storage. The NB 403 and the ASIC 405 are coupled to each other via an accelerated graphics port (AGP) bus 411.

The CPU 401 includes a controller that performs the overall control on the image forming apparatus 400. The NB 403 includes a bridge to couple the CPU 401, the MEM-P 402, the SB 404, and the AGP bus 411. The NB 403 includes a memory controller that controls, for example, the reading and writing from and to the MEM-P 402, a Peripheral Component Interconnect (PCI) master, and an AGP target.

The MEM-P 402 includes: a ROM 402*a* that is a memory storing programs and data to perform each function of the controller 410; and a RAM 402*b* that is used as, for example, a memory to load programs or data and execute drawing for printing from the memory. A program stored in the RAM 402*b* may be provided by being recorded in a computer-readable recording medium, such as a compact disk ROM (CD-ROM), a CD recordable (CD-R), or a DVD, in the form of file installable or executable.

The SB 404 serves as a bridge that couples the NB 403 to a PCI device or a peripheral device. The ASIC 405 includes an integrated circuit (IC) used for image processing including a hardware element used for image processing. The ASIC 405 serves as a bridge that couples the AGP bus 411, a PCI bus 412, the HDD controller 407, and the MEM-C 406. The ASIC 405 includes a PCI target, an AGP master, an arbiter (ARB) that is the core of the ASIC 405, a memory controller that controls the MEM-C 406, a plurality of direct memory access controllers (DMACs) that, for example, rotates image data by using a hardware logic, and a PCI unit that transfers data to a scanner unit 431 and a printer unit 432 via the PCI bus 412. The ASIC 405 may be coupled to a USB interface or an Institute of Electrical and Electronics Engineers 1394 (IEEE 1394) interface.

The MEM-C 406 includes a local memory used as a copy image buffer and a code buffer. The HD 408 includes a storage that stores image data, stores the font data used for printing, and stores a form. The HDD controller 407 controls the reading or writing of data from or to the HD 408 under the control of the CPU 401. The AGP bus 411 includes a bus interface for a graphics accelerator card developed to increase the speed of graphics processing. The AGP bus 411 directly accesses the MEM-P 402 at a high throughput to increase the speed of the graphics accelerator card.

The short-range communication circuitry 420 includes a communication circuitry such as Near Field Communication (NFC) or Bluetooth (registered trademark). The short-range communication circuitry 420 performs short-range wireless communications via, for example, an antenna 420a.

The engine controller 430 includes, for example, the scanner unit 431, the printer unit 432, etc. The scanner unit 431 includes a reading device that reads a document, or the like. The printer unit 432 includes a printing device that prints data on a medium. At least one of the scanner unit 431 and the printer unit 432 includes an image processing part for, for example, error diffusion or gamma conversion.

The control panel 440 includes: a panel display 440a such as a touch panel that displays an operation screen, or the like, and receives an input operation, etc. on the operation screen; and an operation button 440b including, for example, a numeric keypad that receives the set value of a condition for image formation, such as a density setting condition, and a start key that receives a copy start instruction. The controller 410 performs the overall control on the image forming apparatus 400 and controls, for example, drawing, communication, and input from the control panel 440.

The image forming apparatus 400 allows a document box function, a copy function, a printer function, and a facsimile function to be sequentially switched and selected by using an application switch key on the control panel 440. A document box mode is set when the document box function is selected. A copy mode is set when the copy function is selected. A print mode is set when the printer function is selected. A facsimile mode is set when the facsimile function is selected.

The network I/F 450 includes an interface for data communications using the communication network 104. The short-range communication circuitry 420 and the network I/F 450 are electrically connected to the ASIC 405 via the PCI bus 412.

<Functional Configuration>

Next, an example of the functional configuration of each device included in the information processing system 100 according to a first embodiment of the present invention is described. The following description is given based on the assumption that the electronic device 103 is the image forming apparatus 400.

(Functional Configuration of the Service Providing Server)

Figure 5:
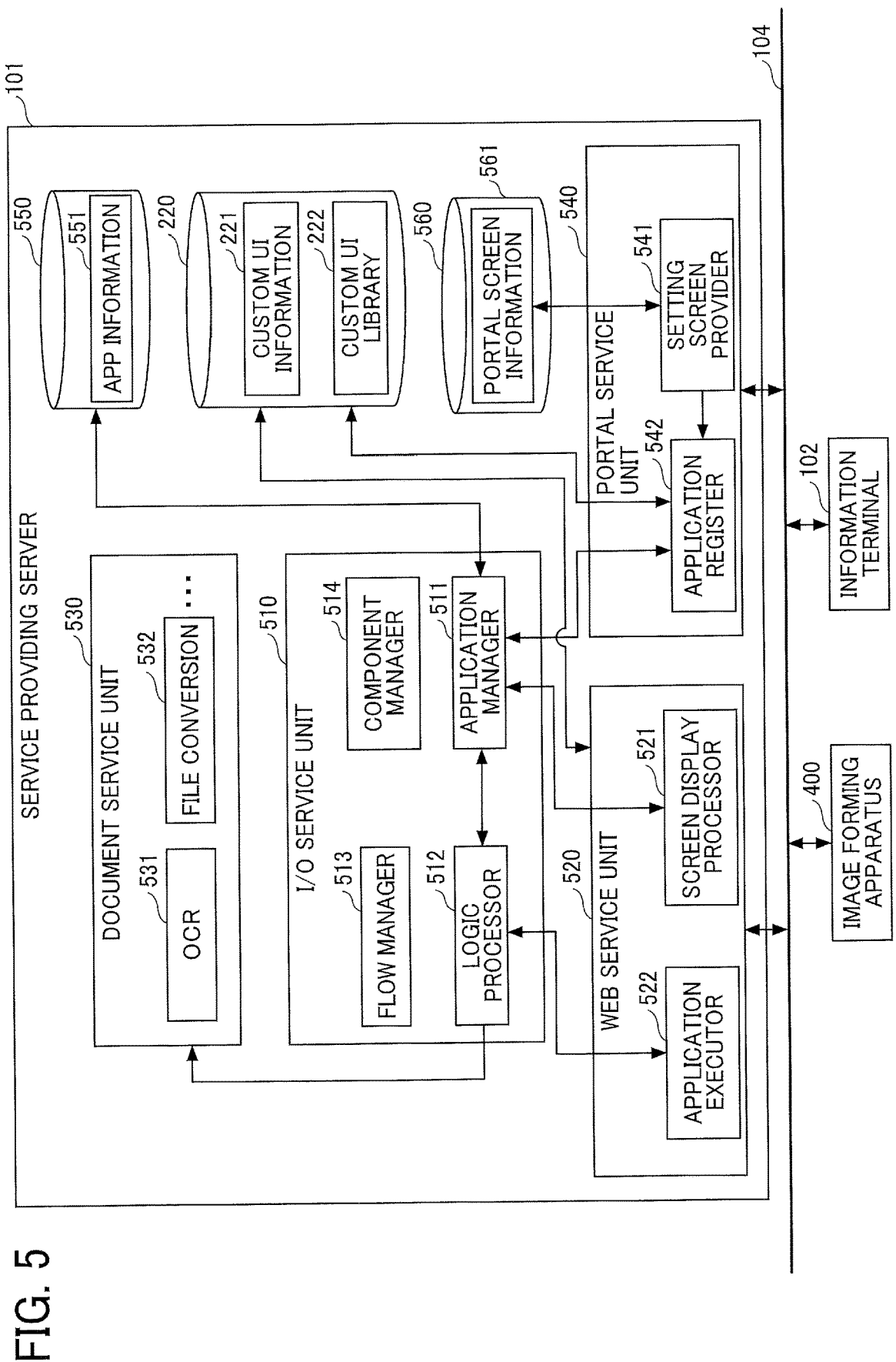
FIG. 5 is a block diagram illustrating an example of the functional configuration of a service providing server according to a first embodiment of the present invention.

FIG. 5 is a block diagram illustrating an example of the functional configuration of the service providing server 101 according to the first embodiment of the present invention.

The service providing server 101 executes one or more programs with, for example, the CPU 301 or the plurality of computers 300 illustrated in FIG. 3 to implement an input/output (I/O) service unit 510, a web service unit 520, a document service unit 530, a portal service unit 540, etc. At least a part of the above-described functional configurations may be implemented by hardware.

The service providing server 101 includes storages such as the custom UI storage 220, an application information storage 550, and a portal screen information storage 560. The custom UI storage 220, the application information storage 550, and the portal screen information storage 560 are implemented by, for example, the HD 304 illustrated in FIG. 3. At least a part of the custom UI storage 220, the application information storage 550, and the portal screen information storage 560 may be implemented by, for example, an external device such as a storage server.

The I/O service unit 510 performs processing regarding, for example, the management of a web application provided by the service providing server 101 and the execution of an application. As illustrated in FIG. 5, the I/O service unit 510 includes, for example, an application manager 511, a logic processor 512, a flow manager 513, and a component manager 514.

The application manager 511 manages a plurality of applications provided by the service providing server 101. For example, the application manager 511 stores the information (hereinafter referred to as app information 551) about a plurality of applications in the application information storage 550 for the management. The app information 551 includes, for example, the identification information (hereinafter referred to as application ID) for identifying an application and work flow (processing procedure) information.

The application manager 511 provides the app information 551 stored in the application information storage 550 in response to a request from, for example, the logic processor 512 or a screen display processor 521. The application manager 511 stores the app information 551 on an application in the application information storage 550 in response to a request from, for example, an application register 542 of the portal service unit 540.

The logic processor 512 acquires the app information 551 managed by the application manager 511 in response to a request from, for example, the web service unit 520. The logic processor 512 executes an application based on the app information 551 acquired from the application manager 511. For example, the logic processor 512 causes the document service unit 530, or the like, to sequentially perform a series of processes defined in the work flow information included in the app information 551.

The flow manager 513 manages the work flow included in the app information 551 stored in the application information storage 550 by the application manager 511. For example, the flow manager 513 performs the process to check the work flow of an application changed by a developer, a user, or the like, and when the work flow is to be corrected, to add the process (component) for executing the work flow to the work flow.

The component manager 514 manages a plurality of components that execute various processes executable in the work flow. For example, the component manager 514 manages components such as optical character recognition/reader (OCR) 531 and file conversion 532 included in the document service unit 530. For example, the flow manager 513 may acquire, from the component manager 514, the information on a component that may be used by the service providing server 101.

The web service unit 520 performs a process so as to use an application provided by the service providing server 101 via the web browser provided by the image forming apparatus 400 (or the information terminal 102). As illustrated in FIG. 5, for example, the web service unit 520 includes the screen display processor 521 and an application executor 522 to function as an application server that provides a web application to the web browser.

Figure 6A:
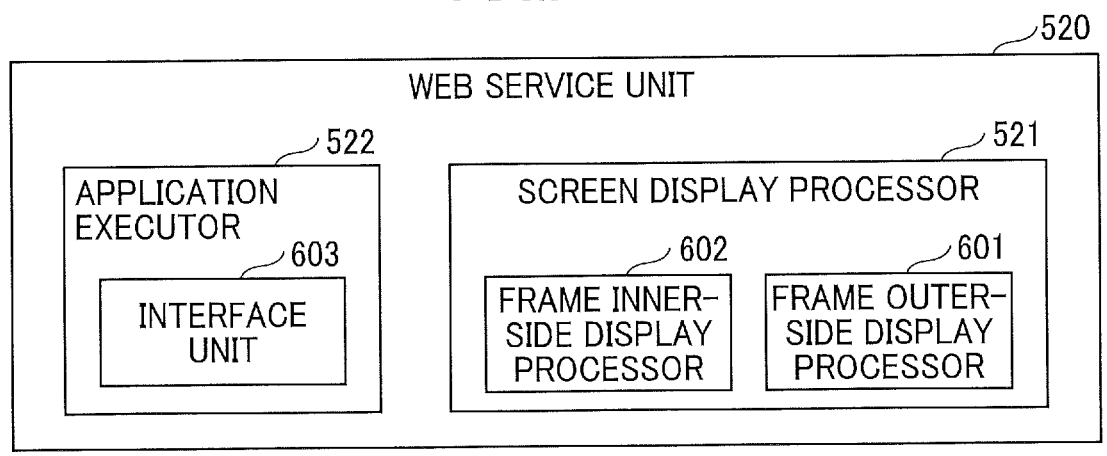
FIG. 6A is a block diagram illustrating an example of the functional configuration of a web service unit according to the first embodiment of the present invention.

In response to a request from the web browser of the image forming apparatus 400 (or the information terminal 102), the screen display processor 521 causes the web browser to display the display screen (hereinafter referred to as app screen) of the application provided by the service providing server 101. The app screen is generated in a language such as Hyper Text Markup Language (HTML), Extensible Markup Language (XML), Cascading Style Sheets (css), or JavaScript (registered trademark). Therefore, the user may perform an operation on the app screen so as to perform various operations for the application. As illustrated in for example FIG. 6A, the screen display processor 521 includes a frame outer-side display processor 601 and a frame inner-side display processor 602. FIG. 6A is a block diagram illustrating an example of the functional configuration of the web service unit 520 according to the first embodiment of the present invention.

The frame outer-side display processor 601 generates an operation screen including the iframe 200 such as the operation screen 230a or the operation screen 230b illustrated in FIG. 2 and causes the web browser provided by the image forming apparatus 400, or the like, to display the generated operation screen.

The frame inner-side display processor 602 acquires the app information 551 of the application and custom UI information 221 from the application manager 511 and uses the acquired information to generate the app screen. The frame inner-side display processor 602 displays a customized app screen in the iframe 200 included in the operation screen such as the operation screen 230a or the operation screen 230b illustrated in FIG. 2.

As described above, the app information 551 includes, for example, the application ID for identifying an application and the work flow (processing procedure) information. The custom UI information 221 includes, for example, the application (hereinafter referred to as custom UI app) for displaying the display screen (UI) that is registered by the developer and is customized and the application ID for identifying the application. Therefore, the correspondence relation between the app information 551 and the custom UI information 221 may be specified by using the application ID.

The application executor 522 controls the execution of an application in accordance with the user's operation on the app screen. For example, the application executor 522 includes an interface unit 603 illustrated in FIG. 6A.

The interface unit 603 includes the interface provided by the application executor 522 to use one or more functions of the information processing system 100. The interface unit 603 is implemented by using, for example, a custom UI library 222 executed by the CPU 301. The custom UI library 222 includes one or more scripts (e.g., a copy processing script or a scan processing script) that may be used from within the iframe 200. The custom UI library 222 is previously stored in the custom UI storage 220, or the like.

One or more functions provided by the information processing system 100 include various functions such as the acquisition of the previously executed job ID, the acquisition of a result based on the job ID, the execution of scanning or printing, the transition to the home screen, the transition to the job history screen, or the storage or acquisition of a status. One or more functions provided by the information processing system 100 include functions such as the OCR 531 and the file conversion 532 included in the document service unit 530.

Although it is difficult for the custom UI app displayed in the iframe 200 to directly control each of the above-described functions provided by the information processing system 100, the custom UI app may use each of the above-described functions by using the interface unit 603.

FIG. 6B is a schematic view illustrating a custom UI app 610 and the custom UI library 222 according to the first embodiment of the present invention. The custom UI app 610 includes, for example, information 611 that defines a display element to be displayed on the app screen and a script 612 that defines the operation details corresponding to the display element. In the example of FIG. 6B, when "start button", which is an example of the display element, is selected, the script included in the custom UI library 222 to invoke a function 621 for executing a scan process is executed.

The developers such as vendors may generate the above-described custom UI app 610 so as to cause the operation screen of the image forming apparatus 400 to display the customized display screen 201 or the customized display screen 202 illustrated in for example FIG. 2.

Accordingly, the application executor 522 may request the logic processor 512 to execute, for example, the work flow selected on the application display screen displayed in the iframe 200. The application executor 522 may request such as the image forming apparatus 400 to execute the image forming process selected on the application display screen displayed in the iframe 200.

That is, the application executor 522 receives a request for executing a function via the interface unit 603, in response to operation to a display screen displayed in the iframe 200, and controls execution of such function.

The document service unit 530 executes the process defined in the work flow by using the components such as the OCR 531 or the file conversion 532 under the control of the logic processor 512.

The OCR 531 includes a component that performs an OCR process to read characters from, for example, the image of the document scanned by a scanner and convert the characters into text data. The file conversion 532 includes a component that performs a file conversion process to convert the data format of electronic data. The OCR 531, the file conversion 532, etc. are examples of the components included in the document service unit 530. The document service unit 530 may include various components other than the above-described components.

The portal service unit 540 performs a process for the developer of the application to, for example, register and set the application using the web browser of the information terminal 102 (or the image forming apparatus 400). As illustrated in FIG. 5, for example, the portal service unit 540 includes a setting screen provider 541 and the application register 542.

The setting screen provider 541 uses portal screen information 561, or the like, stored in the portal screen information storage 560 to generate an app setting screen in response to a request from, for example, the web browser of the information terminal 102 (or the image forming apparatus 400). The setting screen provider 541 causes the web browser of the information terminal 102, or the like, to display the generated app setting screen.

The app setting screen is generated in a language such as HTML, XML, css, or JavaScript. Therefore, the developer performs a predetermined operation on the app setting screen so as to perform a setting operation, etc.

In the application (hereinafter referred to as WF app) generated here, for example, the specific process (e.g., the work flow, the processing details, or the setting information) for the process selected on the display screen (UI) of the above-described custom UI app is set.

The application register 542 requests the application manager 511 to, for example, register, set, or change the WF app in response to a request from the setting screen provider 541. For example, the application register 542 requests the application manager 511 to register the WF app in response to a WF app registration operation, or the like, on the app setting screen provided by the setting screen provider 541.

The custom UI storage 220 stores the custom UI information 221, the custom UI library 222, etc. described above. The application information storage 550 stores the above-described app information 551, etc. The portal screen information storage 560 stores the portal screen information 561 that is information used for the web browser of the information terminal 102 (or the image forming apparatus 400), or the like, to display the app setting screen, etc.

(Functional Configuration of the Image Forming Apparatus)

FIG. 7A is a block diagram illustrating an example of the functional configuration of the image forming apparatus 400 according to the first embodiment of the present invention. The image forming apparatus 400 executes one or more programs with, for example, the CPU 401 illustrated in FIG. 4 to implement a Web browser 701, a custom UI generator 702, a storage 703, a Web Application Programming Interface (API) 704, an image former 705, etc. At least a part of the above-described functional configurations may be implemented by hardware.

The web browser 701 has the function of a typical web browser to, for example, display the web page provided by the service providing server 101 and receive the user's operation on the web page. As described above, the app screen provided from the web service unit 520 of the service providing server 101 is generated in a language such as HTML, XML, css, or JavaScript. The web browser 701 displays the above-described app screen to load the function of the web service unit 520 into the web browser 701 and execute the function in the form of script.

The custom UI generator (generator) 702 is implemented by, for example, a program (e.g., the customization tool 210 or Software Development Kit (SDK)) executed by the CPU 401 illustrated in FIG. 4 and is used by the developer to generate the custom UI app. The custom UI generator 702 executes the deploy process to register (upload) the custom UI app generated by the developer in the service providing server 101 and make it available.

The storage 703 stores various types of information such as the custom UI app generated by the custom UI generator 702.

The Web API 704 provides the service providing server 101 with the API for using the image forming functions provided by the image forming apparatus 400, such as scanning, printing, copying, or faxing. Thus, the service providing server 101 may cause the image forming apparatus 400 to execute an image forming process by the use of the Web API 704.

The image former 705 is implemented by, for example, the program executed by the CPU 401 illustrated in FIG. 4 or the engine controller 430 to execute an image forming process such as scanning, printing, copying, or faxing.

(Functional Configuration of the Information Terminal)

FIG. 7B is a block diagram illustrating an example of the functional configuration of the information terminal 102 according to the first embodiment of the present invention. The information terminal 102 executes one or more programs with, for example, the CPU 301 illustrated in FIG. 3 to implement the web browser 701, the custom UI generator 702, the storage 703, and the like. As the web browser 701, the custom UI generator 702, and the storage 703 provided in the information terminal 102 are the same as the web browser 701, the custom UI generator 702, and the storage 703 provided in the image forming apparatus 400, the descriptions thereof are omitted.

<Process Flow>

Next, the process flow of the information processing method according to the first embodiment is described.

(Application Registration Process)

Figure 8A:
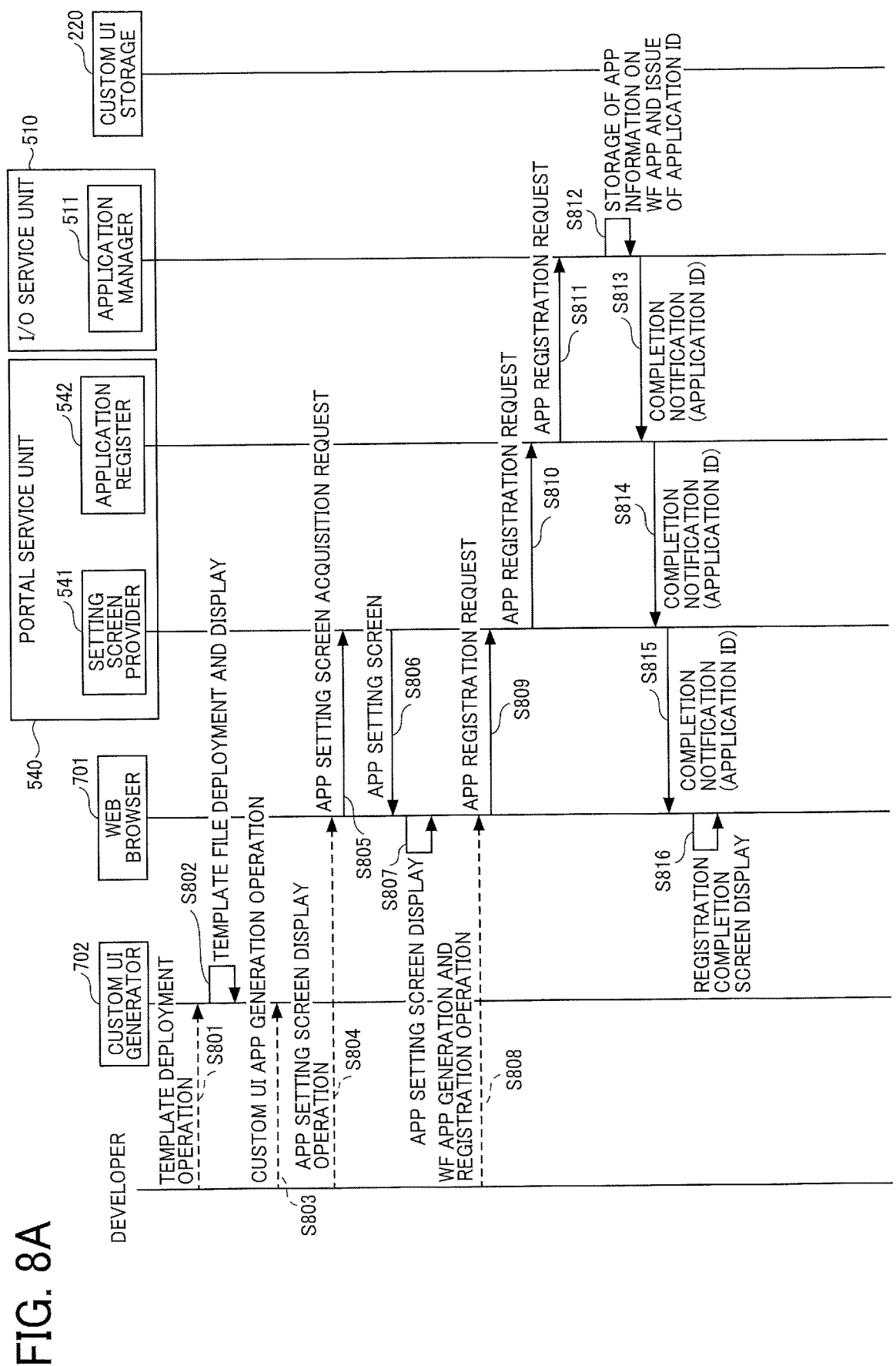
FIG. 8A is a sequence diagram illustrating an example of the process to register an application according to the first embodiment of the present invention.

FIG. 8A is a sequence diagram illustrating an example of the process to register an application according to the first embodiment of the present invention. This process is an example of the process performed by the developer to generate the custom UI app, the WF app, or the like, by the use of the information terminal 102 (or the image forming apparatus 400), etc. and register the generated application in the service providing server 101. The web browser 701 and the custom UI generator 702 illustrated in FIG. 8A may be provided in the information terminal 102 or the image forming apparatus 400.

At step S801, the developer performs the operation to deploy the template for customizing the display screen of the application. For example, the developer activates the customization tool 210, which is installed in the information terminal 102, or the like, so as to execute a template deployment command.

At step S802, the custom UI generator 702 deploys and presents the previously stored template file in response to the received template deployment operation. The template is a sample app, or the like, which is a customization template, and is generated in a language such as HTML, css, or JavaScript.

At step S803, the developer uses the deployed template to perform the operation to generate the custom UI app. For example, as illustrated in FIG. 6B, the developer generates (implements) the custom UI app 610.

The operations described at steps S802 and S803 are examples, and the developer may generate (implement) the custom UI app without using the template.

After generating the custom UI app, the developer performs the process to generate and register the WF app as described at, for example, steps S804 to S815. For the process to generate and register the WF app, any desired art may be used (for example, JP-2018-01479-A).

For example, at step S804, the developer uses the Web browser 701 to perform the operation to display the app setting screen.

At step S805, the web browser 701 transmits, to the portal service unit 540, the request to acquire the app setting screen in response to the received operation to display the app setting screen by the developer.

At step S806, the setting screen provider 541 of the portal service unit 540 transmits the app setting screen to the web browser 701 in response to the received request to acquire the app setting screen from the web browser 701.

At step S807, the web browser 701 displays the app setting screen received from the setting screen provider 541.

At step S808, the developer uses the app setting screen displayed on the web browser 701 to perform the operation to generate and register the WF app. For example, the developer sets the process (e.g., scanning or printing) performed when each operation button is selected, the work flow, the setting information, etc. to generate the WF app and registers the WF app.

At step S809, the web browser 701 transmits, to the portal service unit 540, the request to register the WF app in response to the received operation of generating and registering the WF app by the developer.

At step S810, in response to the app registration request received from the web browser 701, the setting screen provider 541 of the portal service unit 540 notifies the application register 542 of the received app registration request.

At step S811, the application register 542 transmits the notified app registration request to the application manager 511 of the I/O service unit 510 to request the registration of the WF app.

At step S812, the application manager 511 stores (registers) the app information 551 on the WF app in the application information storage 550 in response to the received request to register the WF app. The application manager 511 issues the application ID corresponding to the WF app stored in the application information storage 550.

At steps S813 to S815, the application manager 511 notifies the web browser 701 of, for example, the completion notification indicating that the registration of the WF app has been completed through the portal service unit 540. For example, the completion notification includes, for example, the application ID corresponding to the WF app stored in the application information storage 550.

At step S816, the web browser 701 displays the registration completion screen indicating that the registration of the WF app has been completed. The registration completion screen displays, for example, the application ID notified by the application manager 511. This allows the developer to check the application ID corresponding to the registered WF app.

(Process to Register the Custom UI Information)

Figure 8B:
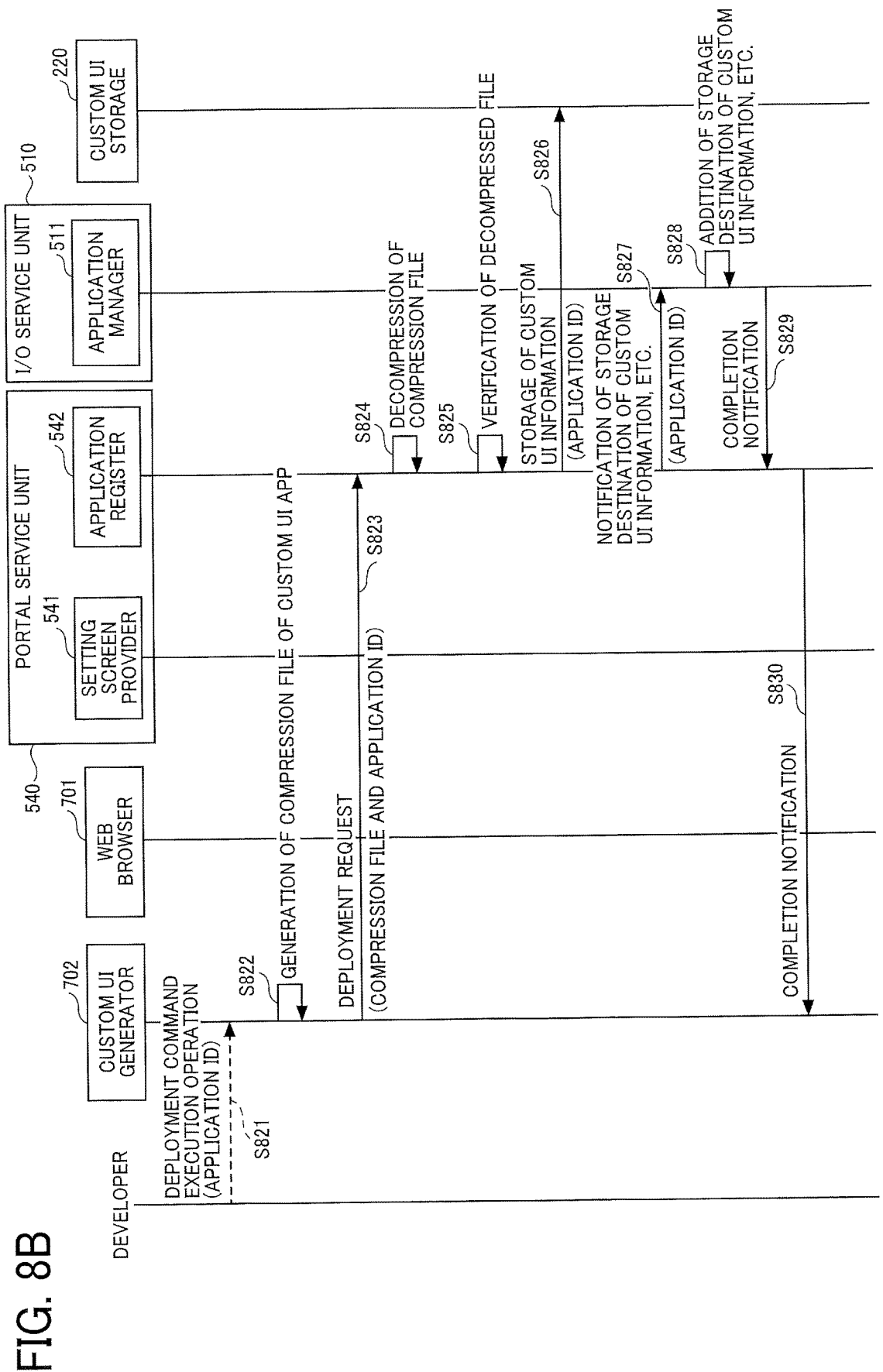
FIG. 8B is a sequence diagram illustrating an example of the process to register custom UI information according to the first embodiment of the present invention.

FIG. 8B is a sequence diagram illustrating an example of the process to register the custom UI information according to the first embodiment of the present invention. This process may be executed, for example, subsequent to the application registration process illustrated in FIG. 8A or at any time after the application registration process illustrated in FIG. 8A is performed.

At step S821, the developer performs the operation to execute a deployment command so as to use the customized application (the custom UI app). The developer inputs the application ID checked at step S816 of FIG. 8A, for example, to perform the operation to execute the deployment command.

At step S822, the custom UI generator 702 generates a compression file of the custom UI app in response to the received operation of executing the deployment command by the developer.

At step S823, the custom UI generator 702 transmits the deployment request including the generated compression file and the application ID to the portal service unit 540.

At step S824, in response to the deployment request received from the custom UI generator 702, the application register 542 of the portal service unit 540 decompresses the compression file included in the deployment request.

At step S825, the application register 542 verifies the decompressed file. For example, the application register 542 checks the size of the decompressed file, the number of files contained, and the presence or absence of essential file. In the information processing system 100 according to the present embodiment, for example, the file with the name "index.html" is an essential file. For example, the screen display processor 521 of the web service unit 520 assumes that the file with the name "index.html" is the essential file that is to be read when the app screen is displayed in the iframe 200. Therefore, the application register 542 determines that the decompressed file is faulty when, for example, the decompressed file does not contain the file with the name "index.html".

When the decompressed file is not faulty, the process at step S826 and the subsequent steps is executed. Conversely, when the decompressed file is faulty, the application register 542 notifies the custom UI generator 702 that the compression file is faulty and then cancels the process at step S826 and the subsequent steps.

At step S826, the application register 542 stores the custom UI information 221 including the custom UI app in the custom UI storage 220. The custom UI information 221 includes the application ID input at step S821.

At step S827, the application register 542 notifies the application manager 511 of the I/O service unit 510 of the information on the storage destination of the custom UI information 221 and information such as the application ID.

At step S828, the application manager 511 stores, for example, the storage destination of the custom UI information 221 and the application ID notified by the application register 542 in addition to, for example, the app information 551 stored at step S812.

At steps S813 in FIG. 8A, the application manager 511 transmits the completion notification, which is to be notified to the web browser 701, including the application ID. Furthermore, at step S821 in FIG. 8B, the developer uses the application ID displayed on the web browser 701 to perform the operation to execute the deployment command. This allows the application register 542 to, at step S827, easily identify the app information 551 to which the storage destination of the custom UI information 221 is to be added.

At steps S829 and S830, the application manager 511 notifies the custom UI generator 702 of the completion notification indicating that the deployment process has been completed via the application register 542.

The above-described processes in FIGS. 8A and 8B allow the custom UI app generated and registered by the developer to be used in the information processing system 100.

(Process to Display the App Screen)

Figure 9A:
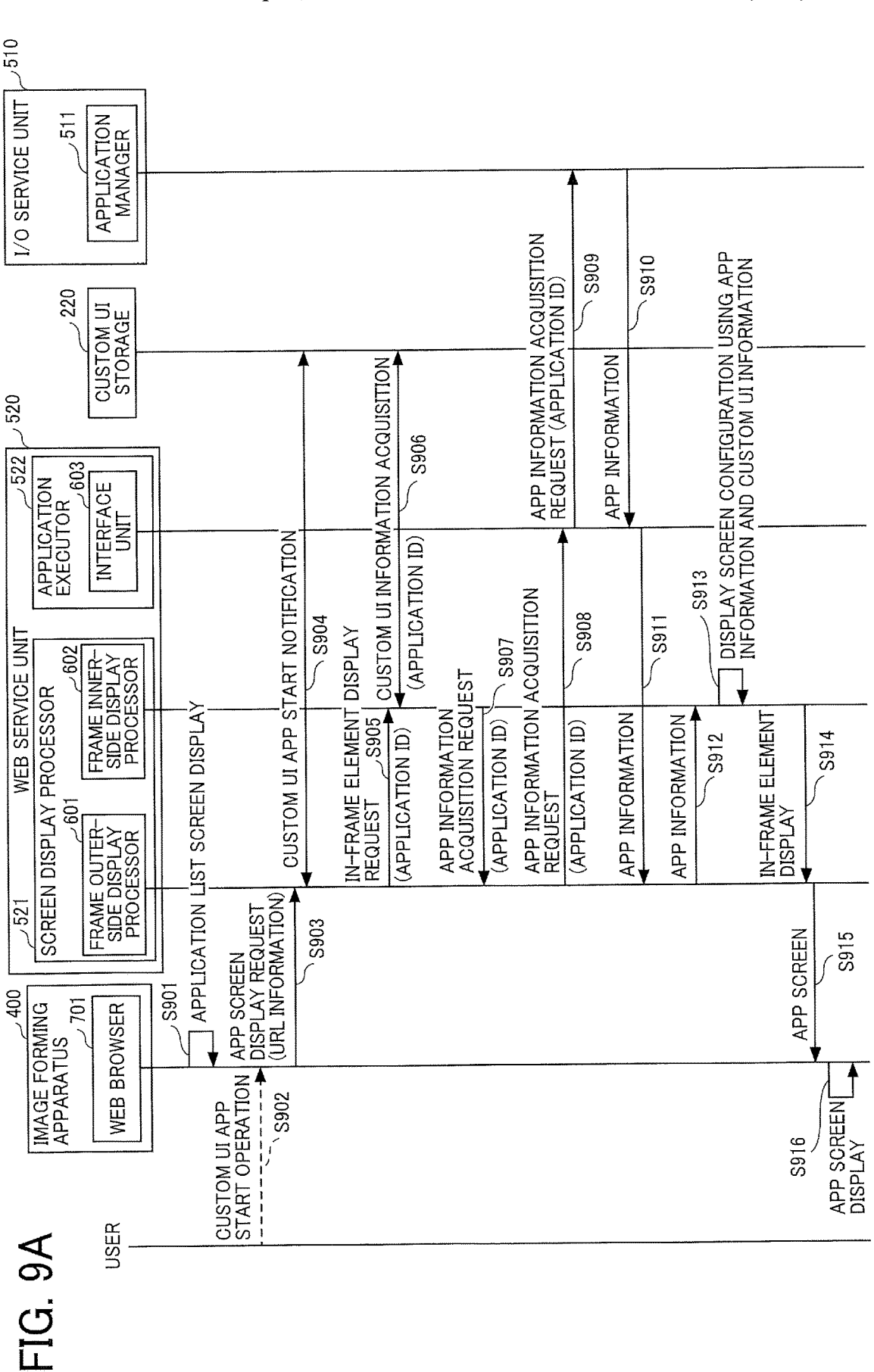
FIG. 9A is a sequence diagram illustrating an example of the process to display an app screen according to the first embodiment of the present invention.

FIG. 9A is a sequence diagram illustrating an example of the process to display the app screen according to the first embodiment of the present invention. This process is an example of the process for the of the image forming apparatus 400 to present, in the image forming apparatus 400, the app screen (e.g., the operation screen 230a and the operation screen 230b illustrated in FIG. 2) of the custom UI app generated and registered during the processes illustrated in FIGS. 8A and 8B.

Figure 9B:
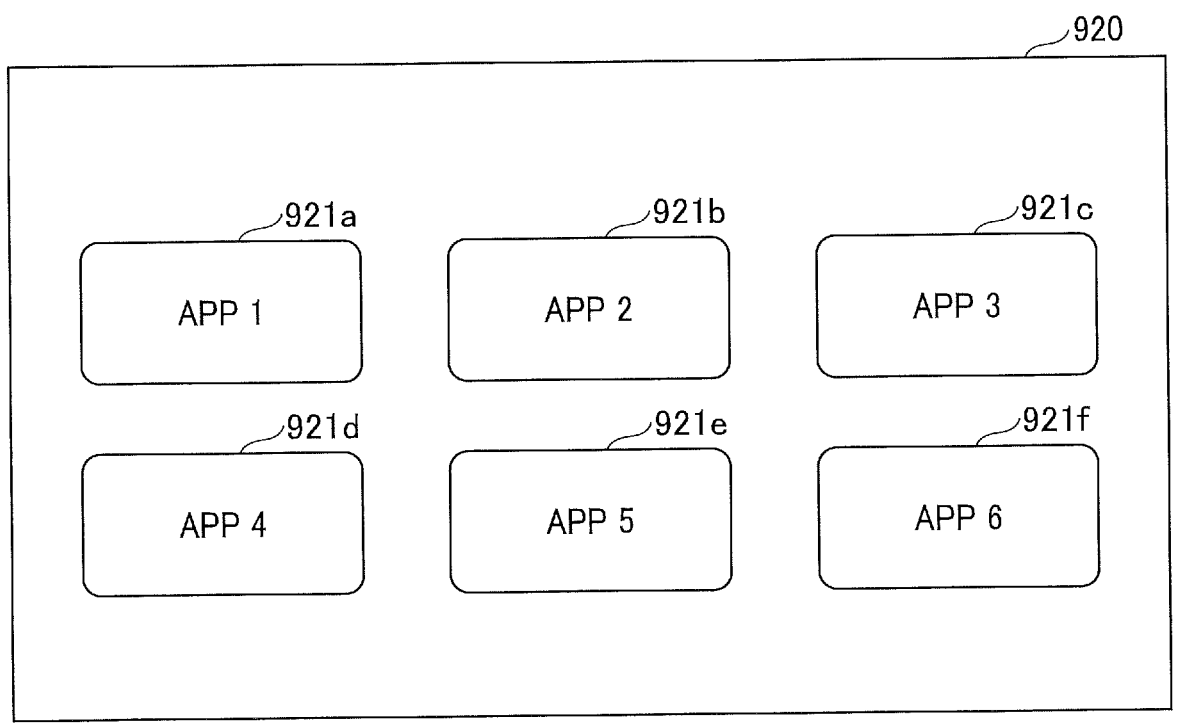
FIG. 9B is a schematic view illustrating an application list screen according to the first embodiment of the present invention.

At step S901, the web browser 701 of the image foaming apparatus 400 presents an application list screen 920 that selectively displays one or more custom UI apps illustrated in for example FIG. 9B.

FIG. 9B is a schematic view illustrating the application list screen 920 according to the first embodiment of the present invention. As illustrated in for example FIG. 9B, the application list screen 920 displays a plurality of selection buttons 921a to 921f for selecting a custom UI app registered in the service providing server 101.

For example, the menu display application for displaying the menu screen of the image forming apparatus 400 causes the application list screen 920 to be displayed in the web browser 701 based on the application list information notified by the web service unit 520.

FIG. 9C is a diagram illustrating an example of application list information 930 according to the first embodiment of the present invention. In the example of FIG. 9C, the application list information 930 includes a plurality of pieces of application information 931a to 931f. In the following description, any piece of application information among the pieces of application information 931a to 931f is referred to as "application information 931".

The application information 931 includes, for example, Uniform Resource Locator (URL) information 932 on the custom UI app, name information 933, and icon information 934. For example, the menu display application uses the name information 933 and the icon information 934 included in the application information 931a to display the selection button 921a for selecting "app 1" on the application list screen 920 illustrated in FIG. 9B.

When the selection button 921a is selected, the menu display application transmits, to the web service unit 520, the request to display the app screen including the URL information 932 included in the application information 931a. According to the present embodiment, the URL information 932 includes an application ID 935 that is the information for identifying the custom UI app. The information for identifying the custom UI app is not limited to the application ID 935 and, for example, information other than the application ID, e.g., the application name, may be used.

The menu display application displays the other selection buttons 921b to 921f on the application list screen 920 illustrated in FIG. 9B based on pieces of application information 931b to 931f in the same manner.

Here, referring back to FIG. 9A, the description of the sequence diagram is continued.

At step S902, the user performs the operation to start the custom UI app. For example, the user selects the selection button 921a of the "app 1" on the application list screen 920 illustrated in FIG. 9B to start the "app 1".

At step S903, in response to the received operation of starting the custom UI app from the, the web browser 701 of the image forming apparatus 400 transmits the request to the screen display processor 521 of the web service unit 520 so as to display the app screen.

The app screen display request includes the URL information 932 including the application ID 935 of the selected custom UI app.

At step S904, in response to the app screen display request, the frame outer-side display processor 601 of the screen display processor 521 acquires the custom UI library 222 from the custom UI storage 220. The custom UI library 222 includes for example a common script (e.g., the script for a copy process or the script for a scan process) that may be used via the custom UI app displayed in the iframe 200.

At step S905, the frame outer-side display processor 601 of the screen display processor 521 notifies the frame inner-side display processor 602 of the request to display an in-frame element (the app screen of the custom UI app). The in-frame element display request includes, for example, the application ID acquired from the URL information 932 included in the app screen display request. Alternatively, the in-frame element display request may include the URL information 932 included in the app screen display request instead of the application ID.

At step S906, the frame inner-side display processor 602 acquires the custom UI information 221 corresponding to the application ID included in the in-frame element display request from the custom UI storage 220.

At step S907, the frame inner-side display processor 602 notifies the frame outer-side display processor 601 of the request to acquire the app information 551 corresponding to the custom UI app. The app information acquisition request includes, for example, the application ID acquired from the in-frame element display request.

At step S908, the frame outer-side display processor 601 notifies the interface unit 603 of the application executor 522 of the app information acquisition request notified by the frame inner-side display processor 602.

At step S909, the interface unit 603 requests the application manager 511 of the I/O service unit 510 to acquire the app information corresponding to the application ID in response to the app information acquisition request received from the frame outer-side display processor 601.

At step S910, the application manager 511 notifies the interface unit 603 of the application executor 522 of the app information corresponding to the requested application ID. For example, the application manager 511 acquires the app information including the requested application ID from the app information 551 stored in the application information storage 550 and notifies the app information to the interface unit 603. The app information includes information such as the work flow (processing procedure) executed by the custom UI app.

At steps S911 and S912, the interface unit 603 notifies the frame inner-side display processor 602 of the acquired app information via the frame outer-side display processor 601.

At step S913, the frame inner-side display processor 602 uses the acquired app information and the custom UI information to configure the display screen of the app to be displayed within the frame. For example, the frame inner-side display processor 602 generates the customized display screen 201 (the app screen of the custom UI app) illustrated in FIG. 2.

At step S914, the frame inner-side display processor 602 displays the in-frame element (the app screen of the custom UI app).

At step S915, the frame outer-side display processor 601 transmits the app screen of the custom UI app to the web browser 701. For example, the frame outer-side display processor 601 transmits, to the web browser 701, the operation screen 230a displaying the app screen of the custom UI app within the iframe 200 as illustrated in FIG. 2 and causes the web browser 701 to display the operation screen 230a.

At step S916, the web browser 701 of the image forming apparatus 400 displays the app screen transmitted from the frame outer-side display processor 601. The web browser 701 displays, for example, the app screen (the operation screen 230a) displaying the customized display screen 201 (the app screen of the custom UI app) within the iframe 200 as illustrated in FIG. 2.

(Process During Execution of Scan)

Figure 10:
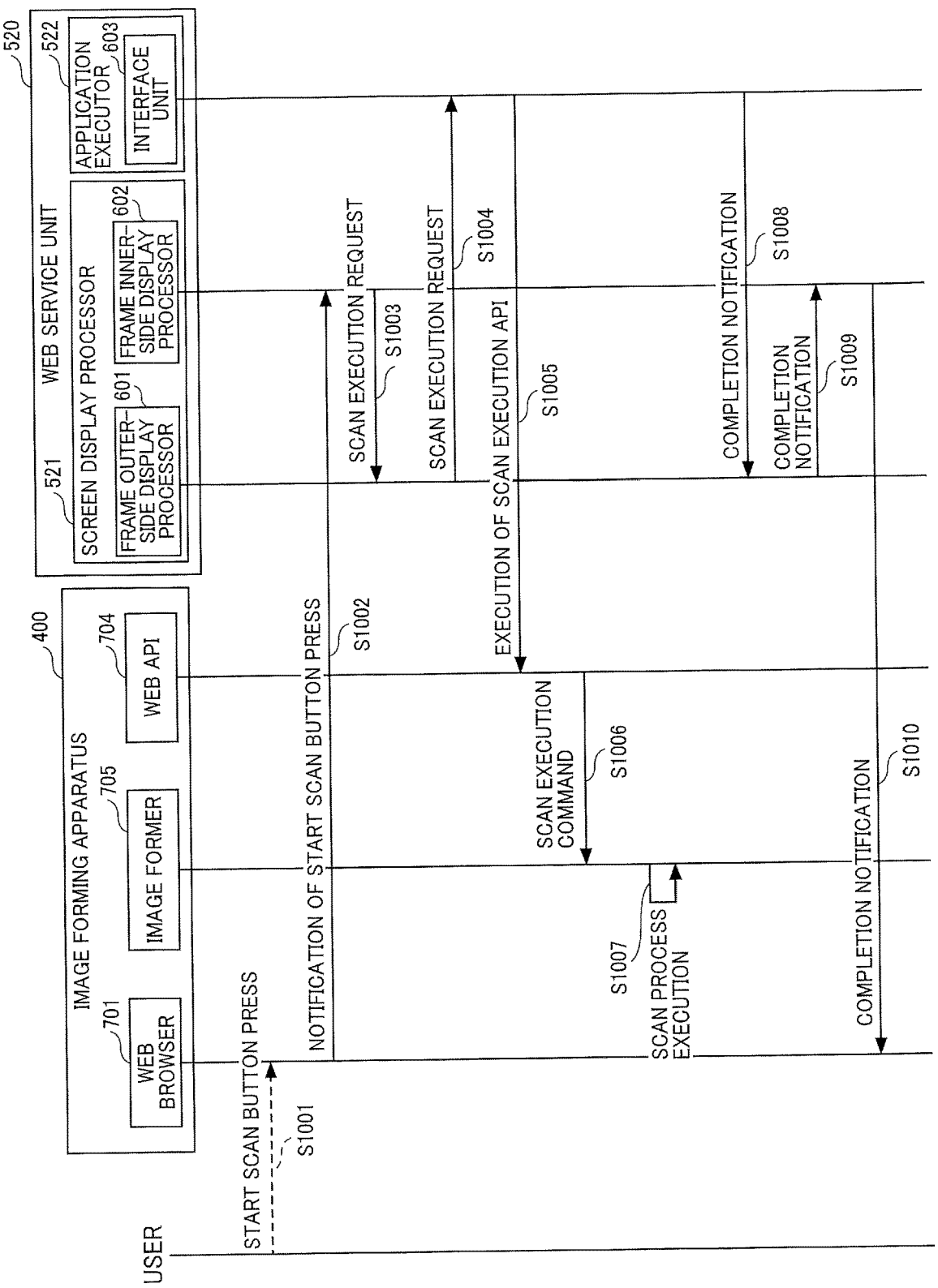
FIG. 10 is a sequence diagram illustrating an example of the process during the execution of scan according to the first embodiment of the present invention.

FIG. 10 is a sequence diagram illustrating an example of the process during the execution of scan according to the first embodiment of the present invention. This process is an example of a predetermined process executed by the information processing system 100 in accordance with the user's operation on the app screen displayed due to the app screen display process illustrated in for example FIG. 9A. The following description is given based on the assumption that the app screen of the custom UI app displayed within the iframe 200 in the web browser 701 of the image forming apparatus 400 presents the "start scan" button that requests the execution of a scan process.

At step S1001, the user presses the "start scan" button displayed on the app screen of the custom UI app displayed by the web browser 701 of the image forming apparatus 400.

At step S1002, the web browser 701 notifies the frame inner-side display processor 602 of the screen display processor 521 that the "start scan" button has been pressed.

At step S1003, the frame inner-side display processor 602 notifies the frame outer-side display processor 601 of the request to execute the scan process by the image forming apparatus 400.

At step S1004, the frame outer-side display processor 601 notifies the interface unit 603 of the application executor 522 of the scan execution request received from the frame inner-side display processor 602. Specifically, the frame outer-side display processor 601 runs scripts of the custom UI library 222 described above.

At step S1005, the interface unit 603 of the application executor 522 executes the scan execution API provided in the Web API 704 of the image forming apparatus 400.

The process described at step S1005 is an example. For example, the application executor 522 may execute the scan execution API of the image forming apparatus 400 via the logic processor 512 of the I/O service unit 510. Alternatively, the application executor 522 may execute the scan execution API of the image forming apparatus 400 via the SDK (Smart SDK JS) that is provided by the service providing server 101 to use the API of the image forming apparatus 400.

At step S1006, the Web API 704 of the image forming apparatus 400 notifies the image former 705 of a scan execution command after the scan execution API is executed.

At step S1007, the image former 705 executes a scan process in response to the scan execution command received from the Web API 704.

At steps S1008 and S1009, the interface unit 603 of the application executor 522 notifies the frame inner-side display processor 602 of the completion notification indicating that the scan process has been executed, via the frame outer-side display processor 601.

At step S1010, the frame inner-side display processor 602 of the screen display processor 521 notifies the web browser 701 of the image forming apparatus 400 that the scan process has been executed.

As illustrated in FIG. 9A and FIG. 10, the frame inner-side display processor 602 uses a function (e.g., the process to acquire app information or the process to execute scan) provided by the information processing system 100 via the frame outer-side display processor 601 and the interface unit 603.

This is because, as described above, the option "sandbox" is enabled in the setting for "iframe" used as a frame in the present embodiment from a security perspective. Enabling this option may prevent the content (the custom UI app) in the iframe from executing an unauthorized process. Furthermore, enabling this option prevents the content in the iframe from directly using a function provided by the information processing system 100.

Therefore, according to the present embodiment, the frame outer-side display processor 601 runs scripts of the custom UI library, etc. in response a request from the frame inner-side display processor 602, such that a function of the information processing system 100 can be used from the custom UI app in the iframe 200.

As described above, according to the present embodiment, the developer generates the custom UI app having the customized display screen so as to flexibly customize the display screen of the application displayed by the electronic device 103 such as the image forming apparatus 400.

In an example described according to a second embodiment of the present invention, the service providing server 101 includes an information manager 1101 that manages temporary information used by applications on a per application basis.

Figure 11:
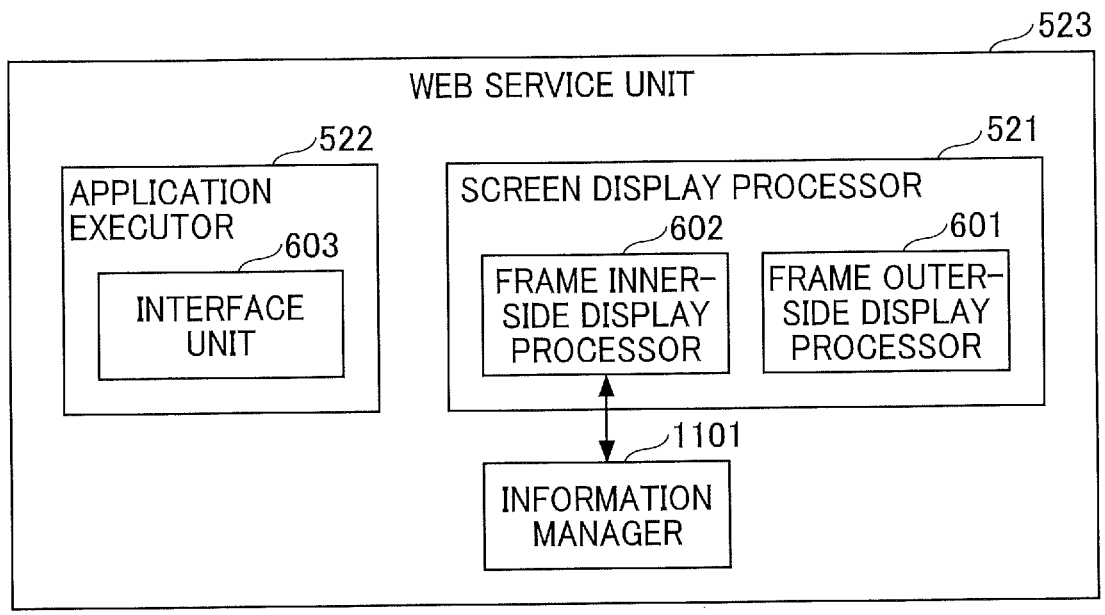
FIG. 11 is a block diagram illustrating an example of the functional configuration of a web service unit according to a second embodiment of the present invention.

FIG. 11 is a block diagram illustrating an example of the functional configuration of a web service unit 523 according to the second embodiment of the present invention. The web service unit 523 according to the second embodiment further includes the information manager 1101 in addition to the functional configuration of the web service unit 520 illustrated in FIG. 5 according to the first embodiment of the present invention.

The information manager 1101 is implemented by, for example, an application outside the iframe 200 executed by the CPU 301 illustrated in FIG. 3. The information manager 1101 manages the temporary information used by applications (custom UI apps) inside the iframe 200 on a per application basis.

In a specific example, a first custom UI app developed by a company X is loaded into the iframe 200, and the first custom UI app is able to perform the process (work flow) to transmit the scanned text to the input mail address. The first custom UI app temporarily stores the once input mail address (temporary information) in the information manager 1101 outside the iframe 200. Accordingly, when a different custom UI app (e.g., a second custom UI app developed by a company Y) is loaded into the iframe 200, it is possible to reuse the information temporarily stored in the information manager 1101 by the first custom UI app.

The information manager 1101 may use, for example, "localStorage" of the web browser 701 to manage the temporary information used by the custom UI app. localStorage is the function using JavaScript to store arbitrary data on the client side (the web browser 701). For example, the storage area corresponding to each custom UI app is prepared in localStorage, such as the storage area for the custom UI app of the company X and the storage area for the custom UI app of the company Y. Although the information stored in the storage area for the custom UI app of the company X may be reused by the custom UI app of the company X, the information is not allowed to be used by custom UI apps of other companies.

For example, the information manager 1101 manages the information temporarily stored by the first custom UI app such that the information is not allowed to be accessed when the second custom UI app is loaded into the iframe 200. As described above, as the temporary information used by the custom UI app is managed for each custom UI app, the temporary information stored by the first custom UI app may be effectively prevented from, for example, being changed by the second custom UI app.

In an example described according to a third embodiment of the present invention, the service providing server 101 includes a vulnerability checker 1201 that checks the vulnerability of the custom UI app registered in the service providing server 101 by the developer.

Figure 12:
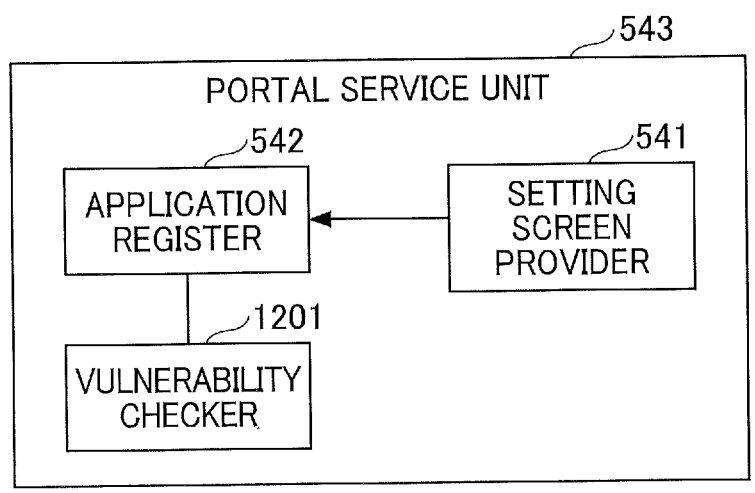
FIG. 12 is a block diagram illustrating an example of the functional configuration of a portal service unit according to a third embodiment of the present invention.

FIG. 12 is a block diagram illustrating an example of the functional configuration of a portal service unit 543 according to the third embodiment of the present invention. The portal service unit 543 according to the third embodiment includes the vulnerability checker 1201 in addition to the functional configuration of the portal service unit 540 illustrated in FIG. 5 according to the first embodiment of the present invention. The vulnerability checker 1201 may be included in the application register 542.

The vulnerability checker 1201 is implemented by, for example, a program executed by the CPU 301 illustrated in FIG. 3 to check the vulnerability of the custom UI app registered in the service providing server 101 by the developer.

For example, the vulnerability checker 1201 checks the vulnerability of the decompressed custom UI app when the application register 542 verifies the decompressed file at step S825 of FIG. 8B. For example, if the decompressed custom UI app has an input form, the vulnerability checker 1201 checks whether there is an injection attack (e.g., cross site scripting or Structured Query Language (SQL) injection) or other vulnerabilities.

In a specific example, the vulnerability checker 1201 previously registers, as a rule regarding the vulnerability check, the information for issue solution, e.g., which condition is to be satisfied and what kind of process is to be performed. The vulnerability checker 1201 may detect the vulnerability of the decompressed custom UI app in a rule-based manner, for example, detects the vulnerability when the registered rule is satisfied.

When the vulnerability checker 1201 detects the vulnerability of the custom UI app, for example, the application register 542 cancels the registration of the custom UI app of which the vulnerability has been detected.

The vulnerability checker 1201 may be provided, for example, outside the portal service unit 543 as long as the vulnerability checker 1201 is provided in the service providing server 101. The vulnerability checker 1201 may check the vulnerability of the custom UI app at times other than when the custom UI app is registered, e.g., when the custom UI app is loaded into the iframe 200.

The third embodiment may be implemented in combination with the second embodiment.

In an example described according to a fourth embodiment of the present invention, the service providing server 101 includes a disclosure manager 1301 that manages the setting information as to whether the custom UI app registered by the developer is allowed to be disclosed. The range of disclosure indicates the range of disclosure among the developers of the custom UI app. This function allows the developer of the custom UI app to make a selection as to whether the developer develops the entire custom UI app by him/herself or the developer develops the custom UI app using the custom UI app developed by a different developer.

Figure 13:
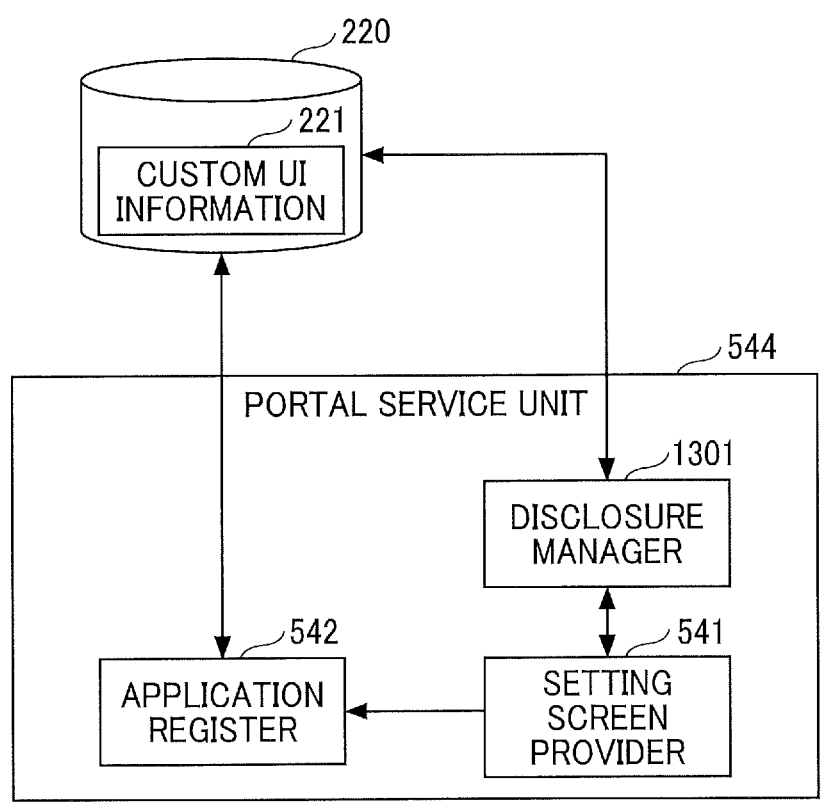
FIG. 13 is a block diagram illustrating an example of the functional configuration of a portal service unit according to a fourth embodiment of the present invention.

FIG. 13 is a block diagram illustrating an example of the functional configuration of a portal service unit 544 according to the fourth embodiment of the present invention. The portal service unit 544 according to the fourth embodiment includes the disclosure manager 1301 in addition to the functional configuration of the portal service unit 540 illustrated in FIG. 5 according to the first embodiment. The disclosure manager 1301 may be included in the setting screen provider 541.

The disclosure manager 1301 is implemented by a program executed by for example the CPU 301 illustrated in FIG. 3 to manage the setting information as to whether the custom UI app registered in the service providing server 101 by the developer is allowed to be disclosed.

For example, the disclosure manager 1301 may cause the web browser 701 of the information terminal 102 (or the image forming apparatus 400), or the like, to display the setting screen for specifying the setting as to whether the custom UI app registered in the service providing server 101 by the developer is allowed to be disclosed. The disclosure manager 1301 stores the setting information set by the administrator, or the like, and indicating whether the custom UI app is allowed to be disclosed in, for example, the HD 304 illustrated in FIG. 4 for the management.

When the custom UI app registered in the service providing server 101 is allowed to be disclosed, the disclosure manager 1301 allows the custom UI app to be used by other developers.

This allows the developer to create a new custom UI app based on the custom UI app that is registered in the service providing server 101 by a different developer, or the like, and is allowed to be disclosed in the setting.

The fourth embodiment may be implemented in combination with the second embodiment, the third embodiment, etc.

According to each of the above-described embodiments of the present invention, in the information processing system 100 that provides an application to the electronic device 103, it is possible to flexibly customize the display screen of the application by using the service providing server (server apparatus) 101.

Each function according to each of the above-described embodiments may be implemented by one or more processing circuitries. The "processing circuitry" in this description includes a device such as a processor programmed to execute each function by using software, e.g., a processor implemented by an electronic circuitry, an application specific integrated circuit (ASIC), a digital signal processor (DSP), an field programmable gate array (FPGA), or a circuit module according to a background art, which is designed to execute each function described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

The invention claimed is:

1. An information processing system comprising:
a server apparatus configured to manage an application; and
an electronic device configured to communicate with the server apparatus via a network, the electronic device having a web browser for displaying a web page provided by the server apparatus, and
the server apparatus including circuitry configured to:
receive a request to register in the server apparatus registration information of an application having a customized display screen, the registration information including setting information set by an administrator of the application to be registered;
cause the display screen of the application to be displayed within a frame of the web page;
manage the setting information, the setting information indicates whether a developer of the application has allowed disclosure of the application;
display the display screen of the application to a second developer different from the first developer in a case where the setting information indicates the disclosure of the application is allowed; and
in response to an input to the display screen displayed within the frame, receive a request for executing at least one function of the information processing system from a script outside the frame, via an interface for providing the at least one function of the information processing system, and control execution of the at least one function.

2. The information processing system according to claim 1, wherein
the application includes a web application, and
the display screen displayed within the frame is for receiving an operation on the web application.

3. The information processing system according to claim 1, wherein
the electronic device is an image forming apparatus, and
the application is provided with the interface for using an image forming function of the image forming apparatus.

4. The information processing system according to claim 1, wherein
the application includes a plurality of applications, and
the circuitry of the server apparatus is further configured to manage temporary information used by the applications on a per application basis.

5. The information processing system according to claim 1, wherein the circuitry of the server apparatus is further configured to check vulnerability of the application.

6. The information processing system according to claim 1, wherein the electronic device includes another circuitry configured to provide a template for generating the application having the display screen customized and register the application generated in the server apparatus.

7. The information processing system according to claim 1, further comprising an information terminal configured to communicate with the server apparatus via the network, the information terminal including another circuitry configured to provide a template for generating the application having the display screen customized and register the application generated in the server apparatus.

8. A server apparatus communicably connected with an electronic device via a network, the server apparatus comprising:
circuitry configured to:
receive a request to register in the server apparatus registration information of an application having a customized display screen, the registration information including setting information set by the administrator of the application to be registered, and the application to be managed at the server apparatus;
cause the electronic device to display a web page, such that the display screen of the application is displayed within a frame of the web page;
manage the setting information, the setting information indicates whether a developer of the application has allowed disclosure of the application;
display the display screen of the application to a second developer different from the first developer in a case where the setting information indicates the disclosure of the application is allowed; and
in response to an input to the display screen displayed within the frame, receive a request for executing at least one function of the information processing system from a script outside the frame, via an interface for providing the at least one function of the information processing system, and control execution of the at least one function.

9. An information processing method comprising:
receiving a request to register in the server apparatus registration information of an application having a customized display screen, the registration information including setting information set by the administrator of the application to be registered, and the application to be managed at a server apparatus;
displaying a web page on an electronic device that communicates with the server apparatus via a network, such that the display screen of the application is displayed within a frame of the web page;
managing the setting information, the setting information indicates whether a developer of the application has allowed disclosure of the application;
displaying the display screen of the application to a second developer different from the first developer in a case where the setting information indicates the disclosure of the application is allowed; and
in response to an input to the display screen displayed within the frame, receiving a request for executing at least one function of the information processing system from a script outside the frame, via an interface for providing the at least one function of the information processing system; and
controlling execution of the at least one function.

* * * * *